Figure 1:
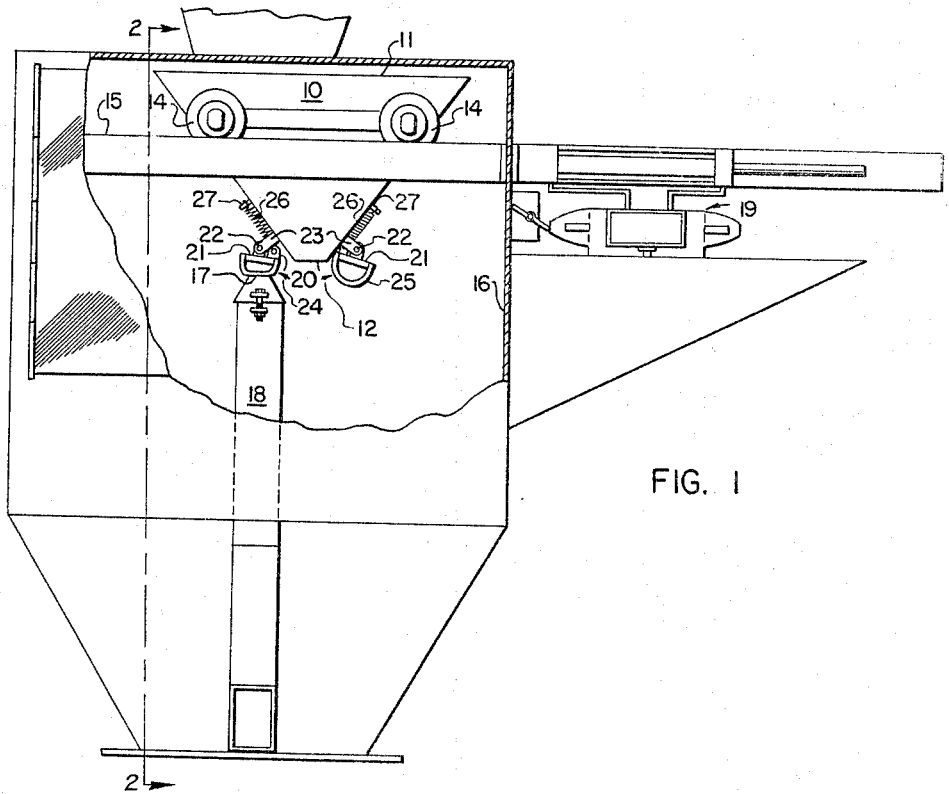

Oct. 18, 1966 F. R. HUNTINGTON 3,279,260
MATERIAL SAMPLING DEVICE AND DUST CLOSURE THEREFOR
Filed May 7, 1964

INVENTOR.
FRED R. HUNTINGTON
BY *Mallinckrodt*
*Mallinckrodt*
ATTORNEYS

United States Patent Office 3,279,260
Patented Oct. 18, 1966

3,279,260
MATERIAL SAMPLING DEVICE AND
DUST CLOSURE THEREFOR
Fred R. Huntington, Salt Lake City, Utah, assignor to
The Galigher Company, Salt Lake City, Utah, a corporation of Utah
Filed May 7, 1964, Ser. No. 365,640
4 Claims. (Cl. 73—423)

This invention relates to devices for sampling flowing materials and especially to closure members useful in connection with such devices.

In my copending application for patent Serial No. 326,502, filed November 27, 1963, I disclose a type of sampler wherein a primary sample cutter discharges samples to a secondary sampling mechanism utilizing a small reciprocating hopper within a housing for receiving the primary samples and for discharging portions thereof, as secondary samples, into the open upper end of a sample discharge chute as such hopper passes thereover during its reciprocative movement, the remainder of the material from the primary samples flowing into and through the housing to rejoinder with the main stream of sampled material.

Closure members for the open end of the discharge chute are carried by the reciprocating hopper, for preventing inadvertent entry of material into the chute when the flow is into the housing. This is important, especially when such materials as uranium ore—wherein the values tend to be concentrated in associated dust—are being sampled. If dust from the interior of the housing is permitted to enter the sample discharge chute at other than sampling times, a truly representative secondary or final sample is not obtained.

The sliding closure members disclosed in my aforementioned copending application have proven satisfactory in many instances, but, where the material conveyed is particularly abrasive, the open, sample-receiving end of the discharge chute becomes roughened and the sealing surfaces of the sliding closure members are damaged as they move across such end, so that they cannot effectively prevent dust passage.

It is a primary object of the present invention to avoid this difficulty and to provide sealing means of maximum effectiveness for a sampler of this type and for other generally similar situations.

Outstanding features of the present invention include the provision of a pair of rolling, flexible, closure members attached to the reciprocating, material-conveying hopper, flanking the discharge end thereof, so as to move into sealing relationship with the receiving opening of the sample discharge chute as the material-conveying hopper is moved to uncover it. The rolling action of such flexible closure members insures maximum sealing of the discharge chute opening with minimum wear on the flexible sealing material.

Although the closure members of the present invention are particularly useful in conjunction with the sampler structure shown herein and more fully described in my aforementioned application for patent, Serial No. 326,502, it should be apparent that they can be similarly used in combination with other structures to seal openings having either regular or irregular surfaces.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

Figure 2:
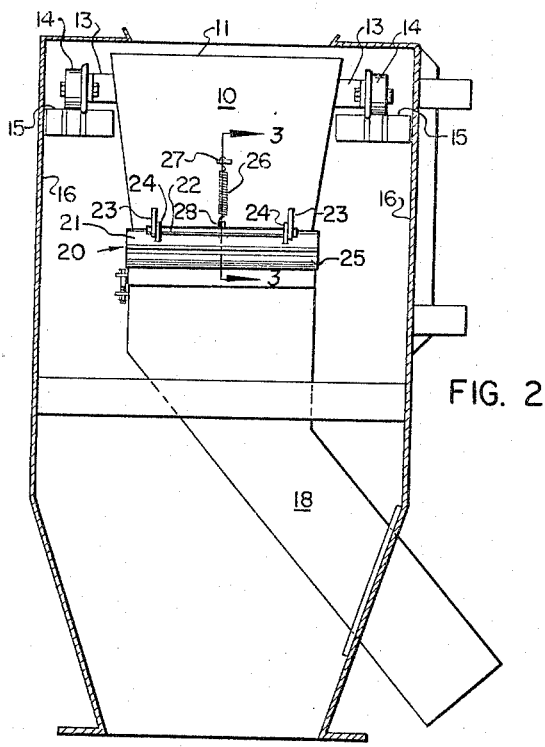

In the drawing:

FIG. 1 is a front elevation of the secondary sampling mechanism of a sampler of the type disclosed in the afore-referred-to application Serial No. 326,502, with a portion of the housing broken away to reveal the reciprocating hopper and closure device;

FIG. 2, a vertical section taken on line 2—2 of FIG. 1; and

Figure 3:
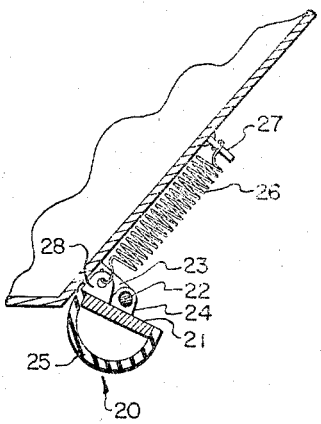

FIG. 3, a fragmentary vertical section taken on line 3—3 of FIG. 1.

Referring now to the drawing:

In the illustrated preferred embodiment, material being conveyed is passed through a reciprocating hopper 10. This hopper includes an inlet 11 and a discharge end 12 and is mounted on a carriage 13, having wheels 14 that roll on tracks 15. The tracks are fixed to housing 16 into which material placed in the movable hopper 10 is normally dumped.

In the manner more fully disclosed in my aforementioned copending application for patent Serial No. 326,502, hopper 10 is periodically moved on tracks 15 over an open sample receiving end 17 of a sample discharge chute 18 extending upwardly into housing 16. Material discharged from hopper 10 as it passes over the receiving opening 17 is transported through chute 18 to a location where it can be further proportionately reduced, or where it can be tested.

In operation, hopper 10 is periodically moved by fluid motor 19 from a rest position at one side to another rest position at the other side of open sample receiving end 17. When the hopper is positioned at either side of the opening, material passing through the hopper is discharged into housing 16, from where it may be carried back to the main stream of material by conventional structure, not shown. As the material is dumped into housing 16 through a network of chutes and other enclosure, including hopper 10, it compresses the air ahead and increases the surrounding atmospheric pressure. This positive pressure tends to escape to an area of lower atmospheric pressure through the sample receiving opening, carrying with it the fines suspended in the air. If, however, the opening is maintained closed at all times, other than when the hopper 10 is positioned above it, the dust cannot escape through chute 18 to spoil sample accuracy.

With the present invention, as the hopper is moved in either direction beyond the open sample receiving end 17, a closure member 20 rolls onto the opening to effectively seal it.

Each closure member consists of a rigid backing member 21 pivotally connected to the conveyor by pins 22 passing through ears 23 and 24 on the hopper and backing member respectively. A flexible membrane 25 is fixed at its ends to backing member 21 such that the flexible membrane forms an arcuate and resilient seal that will roll onto the open sample receiving end of chute 18 and that will conform to the opening shape.

Springs 26, attached to the hopper 10 at 27, and to backing members 21 at 28, bias the closure members to a rest position wherein the backing plates contact ears 24. This tilts the backing plates at an angle of from 30°–40° with respect to the top of the open sample receiving end of chute 18 so that when the closure members contact the top of the chute, they will rotate about pins 22 and roll onto the opening. The closure members are positioned such that their arcuate surfaces will contact chute 18 at a point between the ends of membranes 25, and such that the membranes will completely cover the opening 17 when the hopper 10 is moved in a direction to put them in sealing position. As the hopper is moved in the opposite direction, the springs again bias the closure members to a tilted position, thereby rolling them off the opening.

The rolling action of the closure members as they are moved onto the open sample receiving end of chute 18 insures a much longer seal life than is obtained with sliding type seals. Furthermore, it has been found that the rolling closure members act much like a partially inflated automobile tire and as they roll over an object in their path, the seals completely envelop it. Because of its tendency to return to its molded shape, natural rubber having a durometer hardness of 35 and bonded to metal backing members has been found ideally suited as a seal member. This characteristic causes a natural down pressure to be exerted over the entire surface of the opening and causes the seal to effectively conform to the surface of the opening regardless of irregularities therein.

Whereas there is here illustrated and specifically described a certain preferred construction of apparatus which is presently regarded as the best mode of carrying out the invention, it should be understood that various changes may be made and other construction adopted without departing from the inventive subject matter particularly pointed out and claimed herebelow.

I claim:
1. A material sampling device, comprising a housing having a discharge outlet; a conveying hopper having an inlet and a discharge end; means mounting said hopper for reciprocating movement within said housing; a chute extending into said housing having an open sample receiving end in the housing, said opening being positioned beneath the discharge end of the hopper when said hopper is intermediate its path of travel; a pair of closure members having arcuately shaped sealing surfaces carried by said hopper, one of said closure members being adapted to seal the open sample receiving end when the hopper is at one side of the opening and the other of said closure members being adapted to seal the open sample receiving end when the hopper is at the other side thereof.

2. A material sampling device according to claim 1, wherein said closure members each include a rigid backing member; a flexible sealing member fixed at opposite ends to the backing member; means pivotally connecting said backing members to the hopper; and means yieldably biasing the seals into position for engaging the open sample receiving end of the chute.

3. A material sampling device according to claim 2, wherein the flexible sealing member comprises a sheet of rubber.

4. In combination,
means defining an opening;
a closure device, including structure adapted to reciprocate normal to the direction of flow through said means defining an opening;
a backing member pivotally mounted on said structure;
a sheet of flexible material having its opposite ends fixed to said backing member in spaced apart relationship, whereby said flexible material is bowed away from the backing member;
means biasing the backing member to form an angle with respect to the direction of travel of the structure, such that movement of said structure will cause the flexible material to engage the means defining an opening and the backing member will pivot towards a position parallel to the line of travel of the apparatus as the flexible material is rolled into position sealing the opening; and
means for reciprocating said structure.

References Cited by the Examiner
UNITED STATES PATENTS
782,235   2/1905   Gullberg _____ 73—423
FOREIGN PATENTS
983   1854   Great Britain.

LOUIS R. PRINCE, *Primary Examiner.*

S. CLEMENT SWISHER, *Assistant Examiner.*